United States Patent [19]

Kirkham

[11] 4,118,871

[45] Oct. 10, 1978

[54] BINARY INSPECTION PROBE FOR NUMERICALLY CONTROLLED MACHINE TOOLS

[75] Inventor: Edward E. Kirkham, Brookfield, Wis.

[73] Assignee: Kearney & Trecker Corporation, West Allis, Wis.

[21] Appl. No.: 805,914

[22] Filed: Jun. 13, 1978

[51] Int. Cl.² .......................... G01B 7/00; G01B 7/28
[52] U.S. Cl. ........................... 33/174 PC; 33/174 L; 318/16; 318/574; 364/560
[58] Field of Search .......... 33/172 E, 174 L, 174 PC; 235/92 MP, 92 MT, 151.3, 151.32; 318/16, 574; 364/560, 563

[56] References Cited

U.S. PATENT DOCUMENTS

| 2,835,042 | 5/1958 | Tandler et al. .................. 33/174 L |
| 3,164,909 | 1/1965 | Rosenberg ........................ 33/174 L |
| 3,226,833 | 1/1966 | Lemelson ....................... 33/174 PC |
| 3,509,635 | 5/1970 | Meinke ............................. 33/174 L |
| 3,795,054 | 3/1974 | Kinney ........................... 33/174 PC |

Primary Examiner—Richard R. Stearns
Attorney, Agent, or Firm—Cyril M. Hajewski

[57] ABSTRACT

An inspection probe is mounted in the spindle of a numerically controlled machine tool and is moved toward a workpiece therein by the numerical controls until it makes contact with the workpiece. Contact with the workpiece is indicated by change in the output signal of a portable transmitter mounted within the toolholder that carries the inspection probe. The change in output amplitude causes the instantaneous position of the spindle to be recorded in the numerical controls at the instant of contact between the inspection probe and workpiece to indicate the corresponding dimension of the workpiece. Movement of the spindle is stopped after contact between the inspection probe and workpiece to avoid damage to either the inspection probe or the workpiece.

3 Claims, 1 Drawing Figure

BINARY INSPECTION PROBE FOR NUMERICALLY CONTROLLED MACHINE TOOLS

BACKGROUND OF THE INVENTION

This invention relates to inspection probes for measuring the dimensions of workpieces in numerically controlled machine tools. Examples of prior art inspection probes of this type are found in U.S. Pat. Nos. 3,571,934; 3,520,063; and 3,250,012.

As described in the above-noted U.S. patents, the prior inspection probes contain a probe member which is movably mounted in a housing and is coupled to a transducer which produces an output signal indicating the amount of deflection of the probe member from its reference position. The housing is mounted in the spindle of a machine tool containing a workpiece whose dimensions are to be measured. The spindle is then moved by the numerical controls to a predetermined reference position in which the probe member makes contact with the workpiece. The deflection of the probe member when the spindle is in its reference position is used to indicate the corresponding error of the workpiece.

With these prior art probes, the accuracy of the dimensional measurement is limited by the accuracy of the probe deflection measuring means rather than by the accuracy of the numerical control positioning means since the latter is only used to bring the measurement probe to a reference position; the distance from the reference position to the workpiece being indicated by the deflection of the probe member.

SUMMARY OF THE INVENTION

In accordance with this invention, an improved inspection probe and method of using the probe is provided in which the accuracy of the dimensional determination is limited primarily by the accuracy of the numerical control measuring means. The improved inspection probe of this invention includes means for indicating when the probe makes contact with a surface of the workpiece being measured. The probe is mounted in the toolholding means of the machine tool and relative movement is initiated between the probe and the workpiece in the direction of reducing the distance therebetween. When the probe makes contact with the workpiece, the instantaneous position of the toolholding means and/or workpiece is recorded as an indication of the corresponding workpiece dimension. The relative movement between the probe and workpiece is stopped after the probe contacts the workpiece to avoid damage to the probe or the workpiece.

DESCRIPTION OF THE PREFERRED EMBODIMENT

Figure 1:
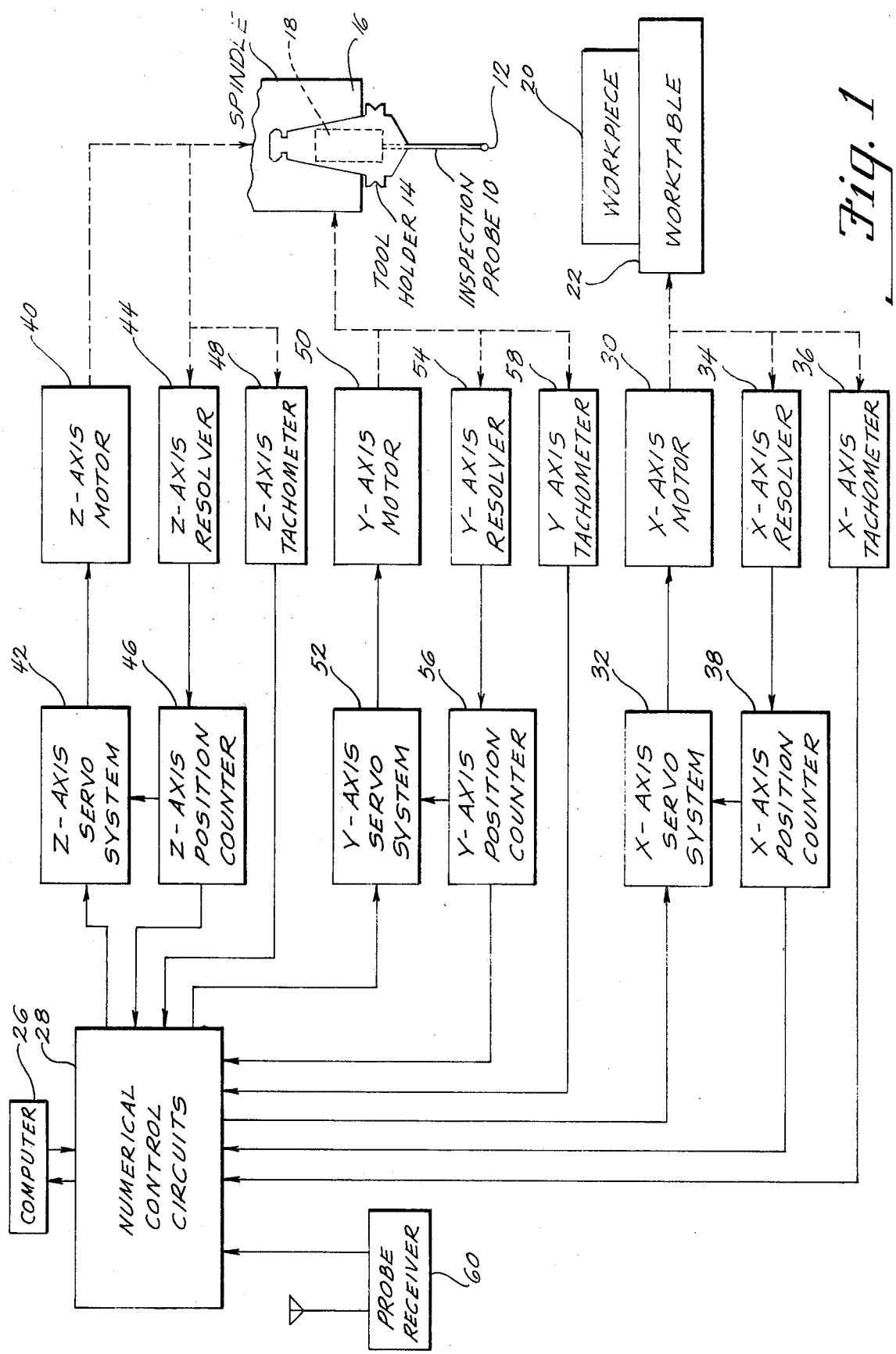
FIG. 1 is a diagrammatic representation of the preferred embodiment of the invention along with a block diagram of a numerically controlled machine tool in which said embodiment is being used.

FIG. 1 illustrates a preferred embodiment of the invention in which an elongated, generally cylindrical inspection probe 10 having a spherical tip 12 is mounted in a toolholder 14 which is adapted to be handled by a conventional automatic tool changer in a conventional numerically controlled machine tool. Toolholder 14 has the external characteristics of the toolholders used to hold cutting tools, but it is modified to hold inspection probe 10 and a portable radio transmitter 18 which are used for making measurements as described hereinafter. Since inspection probe 10 and its associated transmitter 18 are considered to be measuring tools, the holder 14 in which they are mounted is called a toolholder even though it carries probe 10 and transmitter 18 rather than a cutting tool. The machine tool includes a spindle 16 which is adapted to receive toolholder 14 and to clamp toolholder 14 thereto by conventional means not shown. Inspection probe 10 is coupled to a portable radio transmitter 18 mounted within toolholder 14 and causes the transmission characteristics of transmitter 18 to alter when spherical tip 12 makes contact with a surface of a workpiece 20. The alteration of transmission characteristics serves as a signal that inspection probe 10 is in contact with workpiece 20 as is described in later paragraphs.

The numerically controlled machine tool includes spindle 16, worktable 22, the means for moving spindle 16 and worktable 22 along the conventional X, Y and Z axes as described hereinafter, the conventional means (not shown) for rotating spindle 16 to perform work on workpiece 20, a computer 26, and numerical control circuits 28. In this particular embodiment, worktable 22 is mounted for movement along an X axis and is controlled by an X-axis motor 30 which in turn is controlled by an X-axis servo system 32. An X-axis resolver 34 and X-axis tachometer 36 are coupled to X-axis motor 30 and serve as feedback devices therefor. X-axis resolver 34 is coupled to an X-axis position counter 38 which is coupled to X-axis servo system 32 and to numerical control circuits 28 and provides feedback information regarding the position of worktable 22. X-axis tachometer 36 provides feedback information on the X-axis feed rate.

To move worktable 22 along the X-axis, a digital command is applied to numerical control circuits 28 by computer 26. The digital command specifies a destination position along the X-axis for worktable 22. Upon receipt of the digitial command, X-axis motor 30 is energized by X-axis servo system 32 in the proper direction of rotation to move worktable 22 toward its destination. As worktable 22 moves, its instantaneous position is monitored by X-axis servo system 32 via X-axis resolver 34 and X-axis position counter 38. When worktable 22 reaches its destination, rotation of X-axis motor 30 is terminated.

Spindle 16 is mounted for movement along mutually perpendicular Y and Z axes which are both perpendicular to the X-axis. Movement along the Z-axis is controlled by a Z-axis motor 40 which is connected in a servo system (42, 44, 46) similar to that described above for X-axis motor 30. Movement along the Y-axis is controlled by a Y-axis motor 50 which is connected in a servo system (52, 54, 56) similar to that described above for X-axis motor 30. Movement along the Y and Z axes is initiated and controlled in the manner described above for the X-axis.

Transmitter 18 is a portable, battery powered transmitter which is mounted within toolholder 14 along with its battery. Inspection probe 10 is connected to serve as the antenna of transmitter 18, whose R.F. transmissions are received by a probe receiver 60. When inspection probe 10 contacts workpiece 20, inspection probe 10 is shorted out which causes a sharp reduction in the output amplitude of the R.F. transmission. This sharp reduction in the amplitude of R.F. transmission is detected by probe receiver 60 which contains amplitude responsive circuits that switch from a logical 0 to a logical 1 when the drop in amplitude accurs.

The logical output of these amplitude responsive circuits is applied to numerical control circuits 28 to indicate when inspection probe 10 contacts workpiece 20. However, there are other ways in which contact between inspection probe 10 and workpiece 20 can be indicated. For example, instead of reducing the output amplitude, the modulation frequency could be changed when inspection probe 10 contacts workpiece 20. Also, other wireless transmission means could be used such as sound waves.

Workpiece 20 is mounted on worktable 22 in the conventional manner and is machined in the conventional manner. When it is desired to measure a dimension of workpiece 20, the toolholder 14 which carries inspection probe 10 is inserted in spindle 16 by the automatic tool changer. Spindle 16 and/or worktable 22 are then moved so as to move the tip 12 of inspection probe 10 towards the surface of workpiece 20 whose dimension is to be measured. At the instant that inspection probe 10 contacts workpiece 20, as indicated by the drop in output amplitude of transmitter 18, the position of spindle 16 and worktable 22 are recorded in numerical control circuits 28 and serve as an indication of the dimension of workpiece 20 opposite inspection probe 10. After contact is made between inspection probe 10 and workpiece 20, the relative motion therebetween is stopped to prevent damage to probe 10 or workpiece 20. For the same reason, inspection probe 10 may be flexibly mounted in toolholder 14 to permit some overtravel without damage to probe 10 or workpiece 20.

Since the initial position of workpiece 20 with respect to the machine reference points is known, and since the dimensions of inspection probe 10 are also known, it is easy to calculate the subject dimension of workpiece 20 from the position of spindle 16 and worktable 22 at the time that inspection probe 10 contacts workpiece 20. This calculation is normally made in computer 26, although in some cases it can be made by computer components in numerical control circuits 28.

When the above calculation is made, correction factors are introduced to correct several types of errors that occur in the system. First, there are repeatable errors such as caused by inaccuracies in the lead screws and other parts. These errors are measured at the time the machine tool is calibrated and the appropriate correction is introduced during the calculation. Second, there are deflection errors caused by movement of parts such as the leadscrew. When the leadscrew is rotated, it is compressed or stretched by an amount which is proportional to the acceleration of rotation. The rotary speed of the leadscrew is measured by the corresponding tachometers 36, 48, and 58. Acceleration may be calculated therefrom. The resulting deflection errors are also corrected during the calculation. Third, there are dynamic errors such as the following error in the servo system which are also proportional to the speed of the relative movement between inspection probe 10 and workpiece dimension along the measurement axis.

An alternate method of utilizing the inspection probe of this invention is to advance spindle 16 toward workpiece 20 until inspection probe 10 touches workpiece 20; to stop movement of spindle 16; then to back spindle 16 slowly away from workpiece 20 and record the position of spindle 16 at the instant that inspection probe 10 breaks contact with workpiece 20. This compensates for the small but finite time of response of the probe, receiver, and data recording.

It may be advantageous to add a switch in toolholder 14 that will energize transmitter 18 only when toolholder 14 is clamped in spindle 16. When toolholder 14 is returned to the tool storage magazine, this switch would open, thus conserving battery power and extending battery life.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. A method of measuring a dimension of a workpiece in a numerically controlled machine tool, said machine tool including a workpiece holder for holding said workpiece;

means including a detachably mounted toolholder for holding a tool in a position to perform work on said workpiece;

numerical control means for varying the relative position of said workpiece holder and toolholder means in response to digital input signals; and position feedback means indicating the position of said workpiece holder and toolholder means with respect to a machine reference point, said method comprising the steps of:

(1) mounting a toolholder including an inspection probe in said toolholder means;

(2) causing relative motion between said toolholder means and said workpiece holder in the direction of decreasing the distance between said workpiece and inspection probe;

(3) stopping relative movement of said toolholder means and workpiece holder after said inspection probe makes contact with said workpiece;

(4) causing relative motion between said toolholder means and said workpiece holder in the direction of separating said workpiece and inspection probe; and (5) recording the position of said workpiece and toolholder means as indicated by the output of said position feedback means at the instant said inspection probe breaks contact with said workpiece.

2. Apparatus for measuring a dimension of a workpiece in a numerically controlled machine tool including means for detachably mounting a toolholder, said measuring apparatus comprising:

a workpiece holder for holding said workpiece;

means including a measuring toolholder mounted in said mounting means for holding a tool including a probe element in a position to perform measurements on said workpiece;

numerical control means for varying the relative position of said workpiece holder and toolholder means in response to digital input signals;

position feedback means for indicating the position of said workpiece and toolholder means with respect to a machine reference point;

a radio transmitter mounted within said toolholder and being operatively connected to said probe element for producing an electromagnetic output, said output changing in response to said probe element contacting said workpiece;

means for radiating the electromagnetic output of said radio transmitter;

a radio receiver for receiving the electromagnetic radiation from said probe element, the output of said radio receiver being coupled to said numerical control means; and means in said numerical control means for recording the position of said workpiece and toolholder means as indicated by the output of said position feedback means at the instant said probe element makes contact with said workpiece, the recorded positions of said workpiece and toolholder means being a measure of a corresponding dimension of said workpiece.

3. The measurement apparatus according to claim 2 wherein said probe element is coupled to the output of said radio transmitter and acts as the means for radiating the electromagnetic output of said radio transmitter.

* * * * *